United States Patent
Oross

(10) Patent No.: US 6,527,591 B1
(45) Date of Patent: Mar. 4, 2003

(54) EXPANDABLE PORT REPLICATOR FOR COMPUTER UNDERSIDE DOCKING

(75) Inventor: Glen A Oross, Corvallis, OR (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 10/003,751

(22) Filed: Oct. 23, 2001

(51) Int. Cl.[7] ............................................. H01R 25/00
(52) U.S. Cl. ....................................... 439/638; 361/683
(58) Field of Search ........................ 439/638; 361/683; 395/750; 710/129; 385/53, 134

(56) References Cited

U.S. PATENT DOCUMENTS

| | | | |
|---|---|---|---|
| 5,805,833 A | 9/1998 | Verdun | 395/281 |
| D400,515 S | * 11/1998 | Shima | D14/107 |
| 5,991,830 A | 11/1999 | Beard et al. | 710/18 |
| 6,009,492 A | * 12/1999 | Matsuoka | 710/129 |
| 6,151,218 A | * 11/2000 | Pirdy et al. | 361/727 |

* cited by examiner

*Primary Examiner*—Renee Luebke
*Assistant Examiner*—Phuongchi Nguyen
(74) *Attorney, Agent, or Firm*—Jeff D. Limon

(57) ABSTRACT

A port replicator includes a substantially horizontal surface configured to accept the underside of a portable computing unit. The port replicator also includes a first connector, located on the horizontal surface, facing in an upward direction, and being positioned to couple with a connector located on the underside of the portable computing unit. The port replicator also includes a main body that is attached to the horizontal surface, wherein a portion of the horizontal surface is either recessed into the main body or otherwise brought towards the main body when not in use.

4 Claims, 7 Drawing Sheets

EXPANDABLE PORT REPLICATOR FOR COMPUTER UNDERSIDE DOCKING

BACKGROUND OF THE INVENTION

The invention pertains generally to the field of computing devices and, more particularly, to port replicators used with computing devices.

When a user travels with his or her portable computing unit, he or she often requires the use of a peripheral device such as a printer, scanner, or other computing unit such as a personal digital assistant. Thus, users often travel with a port replicator, which enables connection to a peer or peripheral device without requiring the user to bring the entire portable computing unit docking station. However, although port replicators are typically less bulky than conventional computer docking stations, they are far from being optimized for travel and portability.

Additionally, when a port replicator is used, the device may attach to a rear connector of the notebook or portable computing unit. Thus, because of the ability of the computing unit and the port replicator to move relative to each other, the connection between the portable or notebook computing unit and the port replicator may be, at best, only marginally stable. This lack of a stable connection between the two devices can cause interruptions in the connection between the computing unit and the equipment to which the computing device is connected.

Thus, what is needed is a mobile and portable port replicator that provides a stable connection between the portable computing unit and any attached device.

DESCRIPTION OF THE PREFERRED EMBODIMENTS

Figure 1:
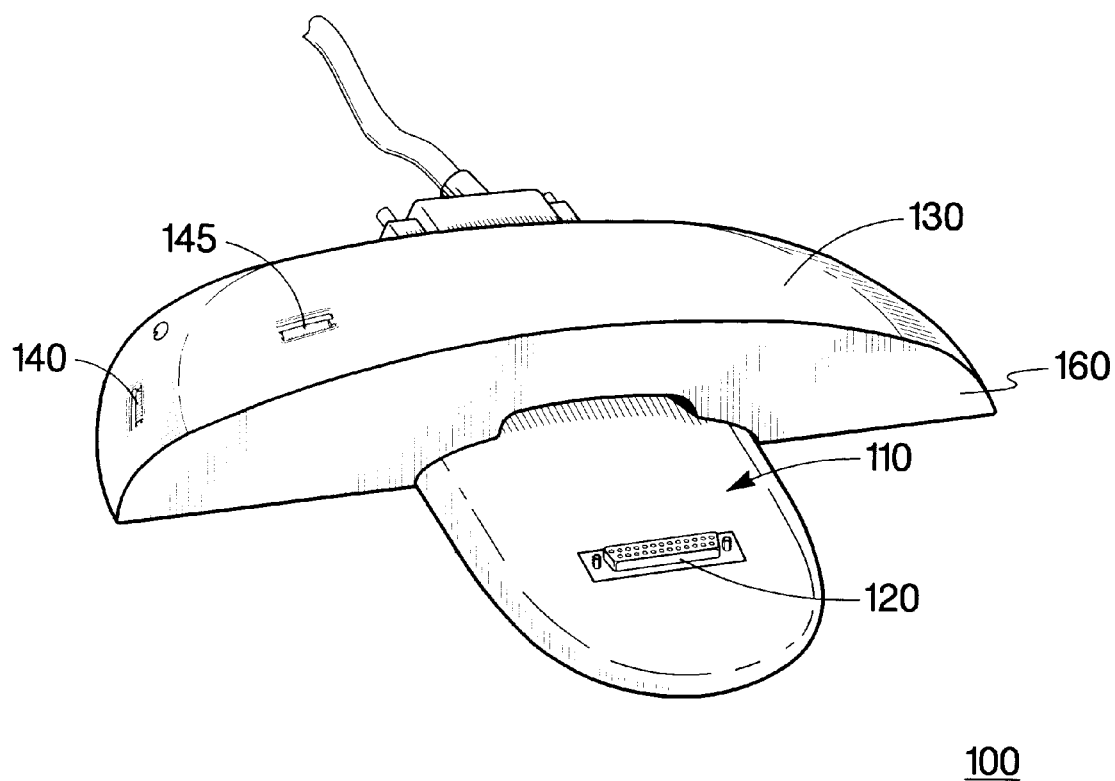
FIG. 1 shows an expandable port replicator for computer underside docking in accordance with a preferred embodiment of the invention.

FIG. 1 shows an expandable port replicator for computer underside docking in accordance with a preferred embodiment of the invention. In FIG. 1, port replicator 100 includes a predominantly flat or curved first surface 110, first connector 120, and main body 130. Preferably, surface 110 is substantially horizontal, thereby allowing first connector 120 to face in a predominantly upward direction. Surface 110 and first connector 120 are desirably formed to allow port replicator 100 to mechanically and electrically connect with a notebook laptop, tablet, or other type of portable computing unit, such as a hand-held personal digital assistant, or a computerized appliance. Because of the space limitations on the external surfaces of the portable computing unit, the portable computing unit may not possess the connectors needed to interface with each of the devices in the user's computing environment. However, the portable computing unit desirably possesses the software needed to support the various types of interfaces present on the port replicator and any accessories (as described in reference to FIGS. 4 and 5 herein).

Main body 130 includes second connector 140 and third connector 145. Both of these connectors preferably possess different mechanical and electrical configurations than first connector 120, thereby allowing second connector 140 and third connector 145 to interface with different types of devices. Thus, second connector 140 may possess a conductor arrangement that corresponds to a Video Graphics Array (VGA) connector, which allows an external monitor to be interfaced with port replicator 100. Additionally, third connector 145 may be a Universal Serial Bus (USB) type connector that enables connection to a printer or other device that makes use of a USB interface. Further, third connector 145 can be a connector compliant with IEEE 1394.

Figure 2:
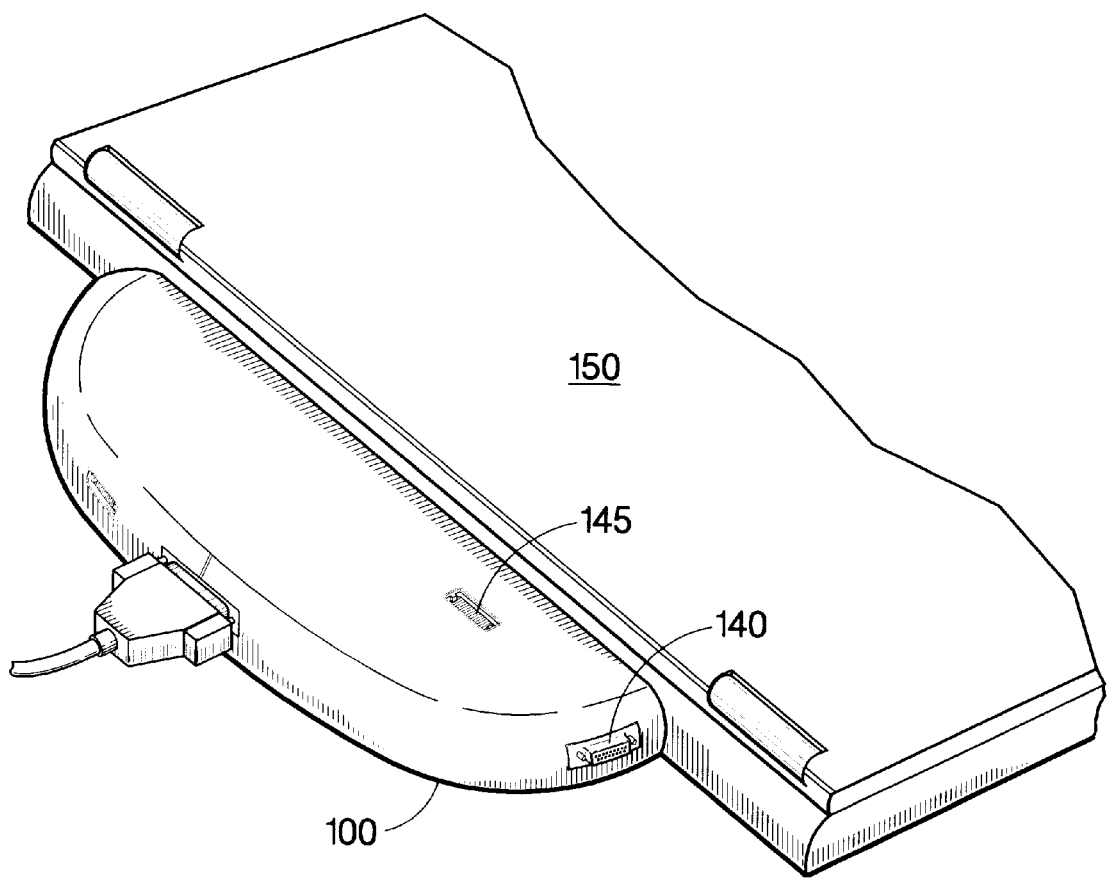
FIG. 2 shows an expandable port replicator for computer underside docking attached to a portable computing unit in accordance with a preferred embodiment of the invention.

FIG. 2 shows an expandable port replicator for computer underside docking attached to a portable computing unit, in accordance with a preferred embodiment of the invention. In FIG. 2, surface 110 as well as first connector 120, are obscured from view by portable computing unit 150, which rests atop surface 110. Second connector 140 is shown as being on a lateral surface of port replicator 100. Portable computing unit 150 is received by surface 110 by bringing the unit into contact with surface 110 and first connector 120 by way of the user placing the portable computing unit into contact with rear wall 160 (of FIG. 1) so that an appropriate portion of portable computing unit 150 can be aligned with first connector 120 of port replicator 100. When portable computing unit 150 has been properly positioned, the user exerts a downward force on the computing unit to bring the unit into contact with surface 110 and with first connector 120.

Figure 3:
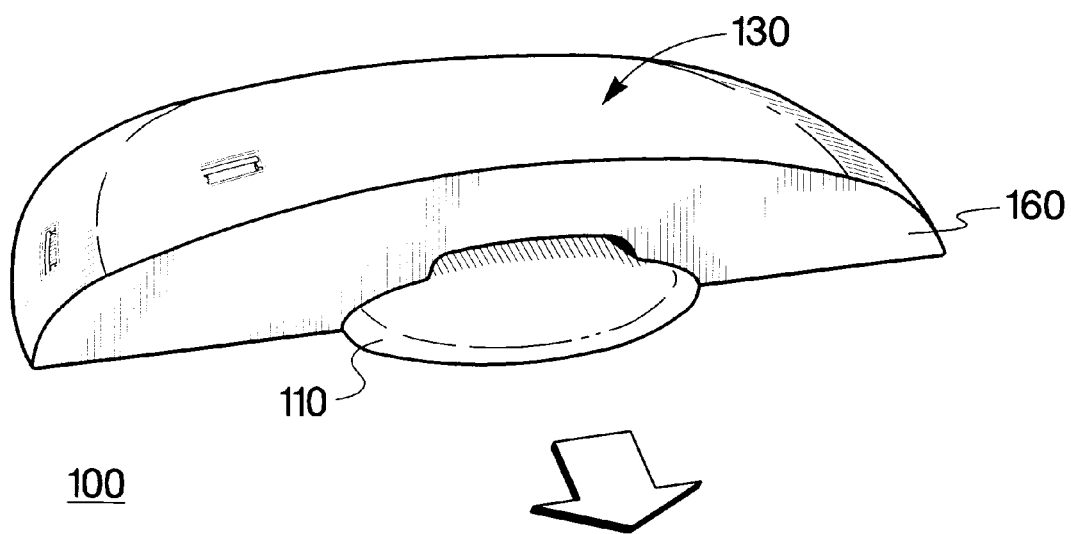
FIG. 3 shows an expandable port replicator for computer underside docking wherein a horizontal surface of the port replicator has been recessed into the port replicator in accordance with a preferred embodiment of the invention.

FIG. 3 shows an expandable port replicator for computer underside docking wherein a horizontal surface of the port replicator has been recessed into the port replicator in accordance with a preferred embodiment of the invention. Desirably, the user need only extend surface 110 from main body 130 to make port replicator 100 ready to accept a portable computing unit. In an another embodiment (FIG. 4), surface 110 employs a hinge near rear wall 160 of main body 130 to allow the surface to be unfolded away from main body 130. Other techniques beyond those mentioned can be used to reduce the space required to store port replicator 100 when the port replicator is not in use.

Figure 4:
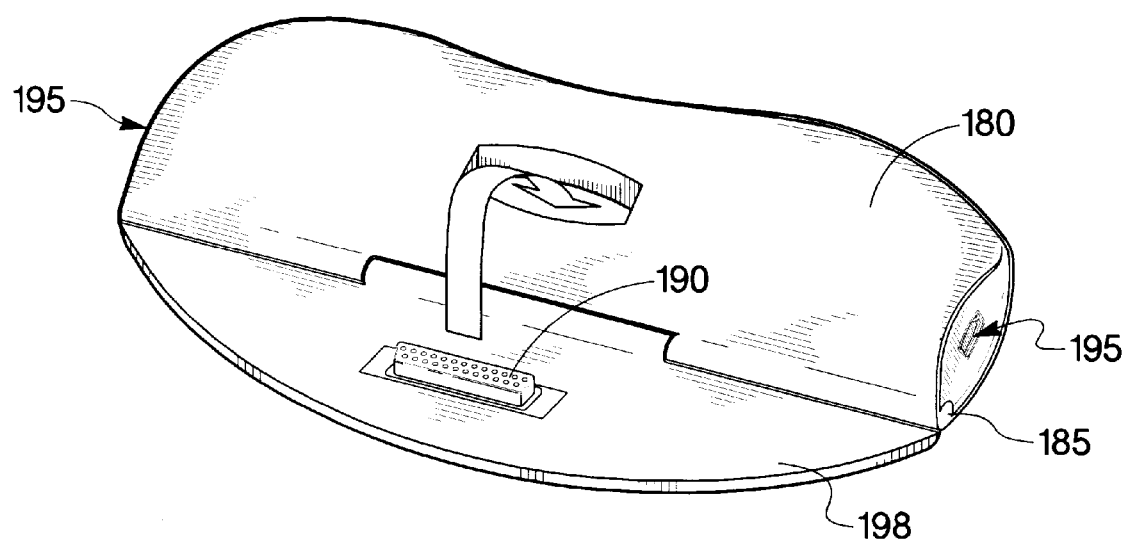
FIG. 4 shows an expandable port replicator for computer underside docking wherein a horizontal surface folds towards a main body of the port replicator in accordance with a preferred embodiment of the invention.

FIG. 4 shows an expandable port replicator for computer underside docking wherein a horizontal surface folds towards a main body of the port replicator in accordance with a preferred embodiment of the invention. In FIG. 4, a first connector 190 located on surface 198 is brought into and out of contact with main body 180. Desirably, hinge 185 permits the rotation of the surface towards the main body.

Connectors 195, located at opposite end portions of main body 180 may each possess a conductor configuration that is different from the other and different from first connector 190.

Figure 5:
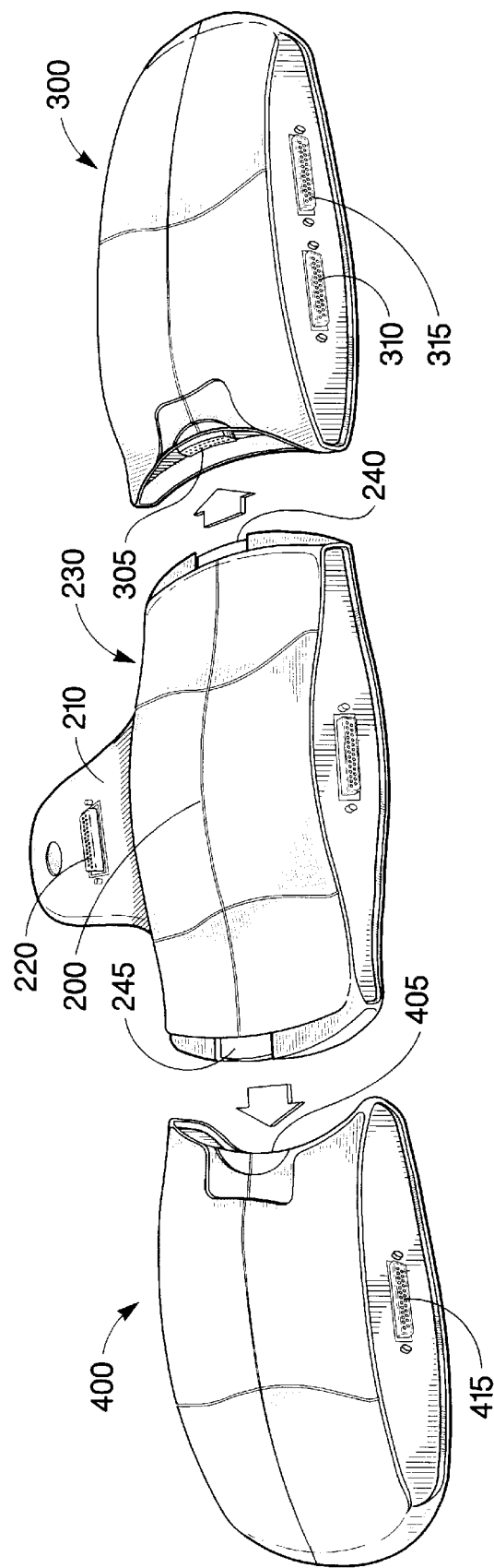
FIG. 5 shows an expandable port replicator for computer underside docking wherein two accessories are ready for attachment to the port replicator, in accordance with a preferred embodiment of the invention.

FIG. 5 shows an expandable port replicator for computer underside docking wherein two accessories are ready for attachment to the port replicator, in accordance with a preferred embodiment of the invention. In FIG. 5, port replicator 200 includes first surface 210 as well as first connector 220, which lies on first surface 210 and faces in an upward direction. Desirably, first surface 210 extends from main body 230 of port replicator 200 in a manner that accords with that of FIG. 3. Port replicator 200 also includes second connector 240 and third connector 245 positioned on opposite end portions of port replicator 200. Second connector 240 as well as third connector 245 can have similar conductor arrangements to allow connection to multiple peer or peripheral devices of a similar type, or may have different conductor arrangements to allow connection to different types of devices.

Accessory 300 includes first accessory connector 305, which connects or joins with second connector 240 of port replicator 200. Additionally, accessory 400 joins or connects with port replicator 200 by way of accessory connector 405, which interfaces with third connector 245. These connections allow a computing unit connected by way of first connector 220 to interface with devices coupled to the computing unit by way of second accessory connector 310, third accessory connector 315, and accessory connector 415. Accessories 300 and 400 provide a capability to increase the number of peer and peripheral devices that can be connected to the computing unit.

Included within the case of port replicator 200 is a conversion unit that maps signals of a first protocol to signals of a second protocol. The conversion unit may also include level shifting electronics to convert signal levels of a first signal type to a second signal type. Additionally, the conversion unit can include electronics that convert single-ended signals to differential signals. Finally, the conversion can include terminations that terminate impedance-sensitive signals in their own impedance.

In the event that first connector 220 of port replicator 200 includes a peripheral component interconnect (PCI) bus connection, the port replicator may only include simple conductor interfaces. These interfaces may be passed through second and third connectors 240 and 245, thus enabling some or all of these signals to be present at connectors 310, 315, and 415. Port replicator 200 can further include a buffer as well as bridge circuitry to provide a more general purpose device that can accommodate a greater number of peripherals beyond a particular number.

Figure 6:
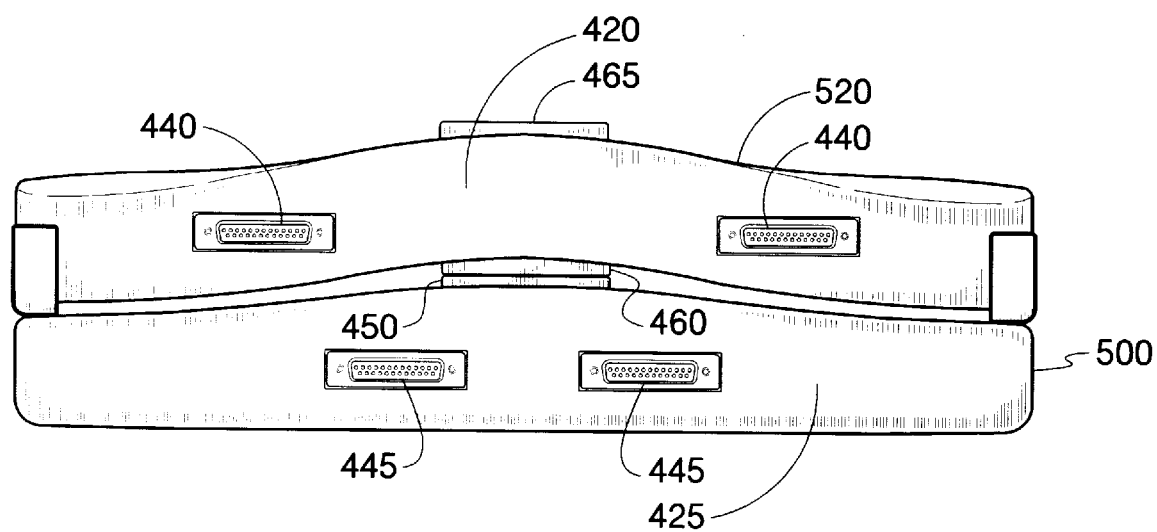
FIG. 6 shows an expandable port replicator for computer underside docking wherein an accessory has been attached to the top of the port replicator in accordance with a preferred embodiment of the invention.

FIG. 6 shows an expandable port replicator for computer underside docking wherein an accessory has been attached to a top portion of the port replicator in accordance with a preferred embodiment of the invention. Although not shown in FIG. 6, port replicator 500 may include a horizontal surface that extends from the port replicator and provides a surface that couples to an underside of a computing unit, as shown in FIG. 3. Alternatively, port replicator 500 may include a horizontal surface that is brought into and out of contact with the port replicator, as shown in FIG. 4.

Port replicator 500 is shown as interfacing with top accessory 520 by way of top accessory connector 450, which joins with bottom connector 460 of top accessory 520. The use of top accessory 520 enables additional interface functionality without requiring additional desk space. Further, top accessory 520 includes top connector 465, which allows connection to a second top accessory, thereby providing expanded connectivity to peer and peripheral devices. Connectors 440 and 445 on lateral surfaces 420 and 425, respectively, provide further interface functionality.

Figure 7:
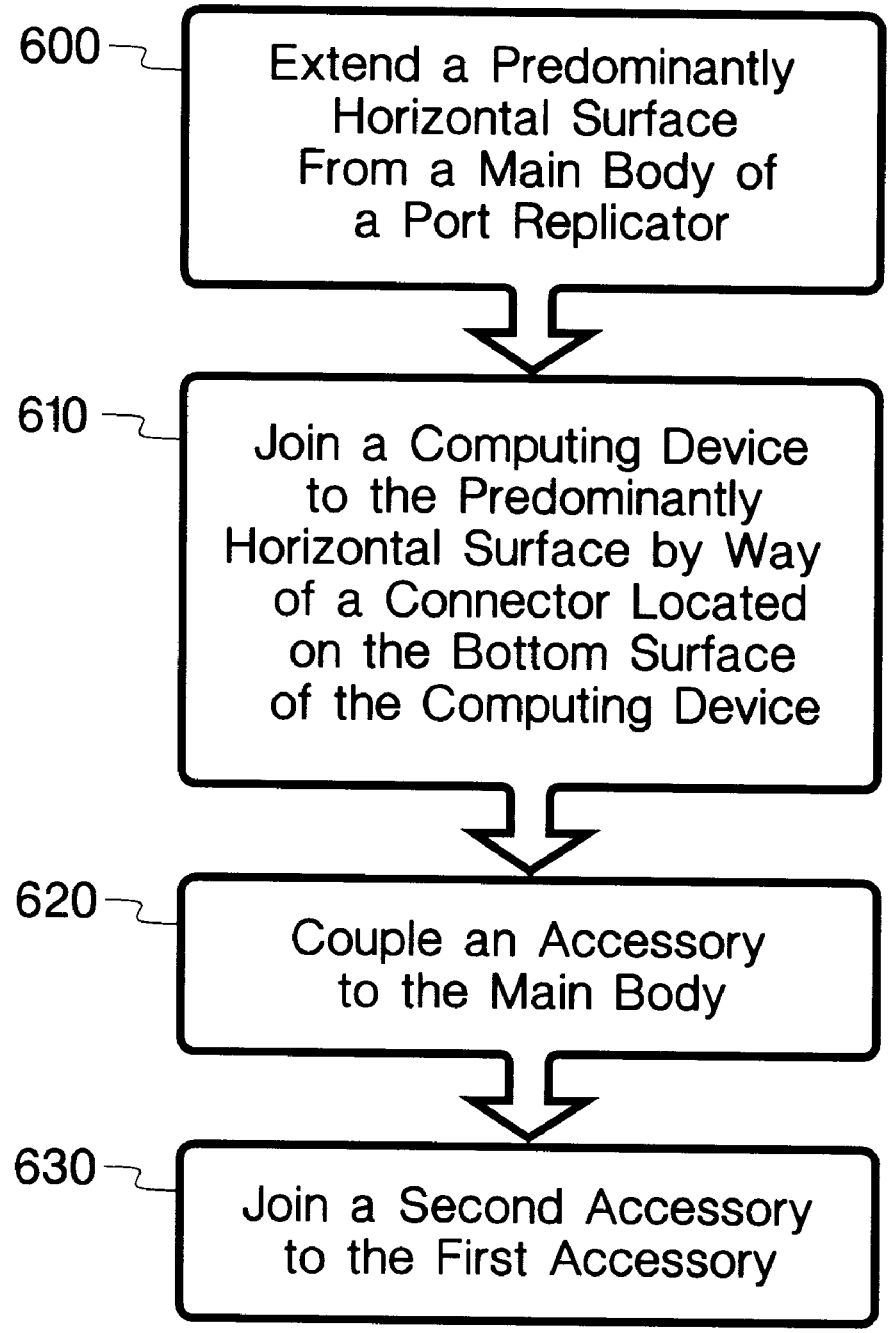
FIG. 7 is a flowchart of a method of coupling a computer to a port replicator in accordance with a preferred embodiment of the invention.

FIG. 7 is a flowchart of a method of coupling a computer to a port replicator and accessories in accordance with a preferred embodiment of the invention. The method of FIG. 7 begins at block 600, in which a predominantly horizontal surface is extended from a main body of a port replicator. The method continues at block 610, in which a computing device is joined to the predominantly horizontal surface by way of a connector located on a bottom surface of the computing device. Preferably, block 610 is performed by way of the connector located on the bottom surface of the computing device contacting an upward-facing connector located on the predominantly horizontal surface.

The method continues at block 620 in which an accessory is coupled to the main body of the port replicator. Preferably, the accessory includes additional connectors not present on the main body of the port replicator. The accessory is also desirably coupled to the main body through a connector positioned on the bottom surface and joins with a connectors positioned on a top surface of the main body.

The method continues at block 630 in which a second accessory is joined to the first accessory. Block 630 is preferably performed by way of a connector, positioned on a bottom surface of the bottom surface of the second accessory that joins with a connector positioned on a top surface of the first accessory.

What is claimed is:

1. A port replicator comprising:

a substantially horizontal surface configured to accept the underside of a portable computing unit;

a first connector located on said substantially horizontal surface, said first connector facing in an upward direction and positioned to couple with a connector located on said underside of said portable computing unit; and a main body being attached to said substantially horizontal surface, wherein a portion of said substantially horizontal surface is extendable from and retractable into said main body.

2. The port replicator of claim 1, further comprising a second connector of said port replicator, said second connector of said port replicator having a mechanical configuration that is different from the mechanical configuration of said first connector.

3. The port replicator of claim 2, further comprising an accessory that attaches to said main body by way of a first connector of said accessory, said first connector of said accessory connecting to said second connector of said port replicator.

4. The port replicator of claim 3, wherein said accessory further comprises a second connector of said accessory, said second connector of said accessory being different than said first connector of said accessory.

* * * * *